United States Patent [19]
Yamane et al.

[11] Patent Number: 6,126,325
[45] Date of Patent: Oct. 3, 2000

[54] RECEPTACLE MODULE FOR OPTICAL TELECOMMUNICATION

[75] Inventors: Takashi Yamane, Kawasaki; Toshiya Kishida, Sapporo; Sadayuki Miyata; Tatsuro Kunikane, both of Kawasaki, all of Japan

[73] Assignee: Fujitsu Limited, Kawasaki, Japan

[21] Appl. No.: 09/129,743

[22] Filed: Aug. 5, 1998

[30] Foreign Application Priority Data

Jan. 21, 1998 [JP] Japan ................................. 10-009647

[51] Int. Cl.[7] .............................. G02B 6/36; G02B 6/42
[52] U.S. Cl. ............................. 385/92; 385/70; 385/77; 385/78; 385/88
[58] Field of Search ................. 385/55–60, 69, 385/76–78, 88–94

[56] References Cited

U.S. PATENT DOCUMENTS

| | | | |
|---|---|---|---|
| 4,553,813 | 11/1985 | McNaughton et al. | 385/89 |
| 4,747,656 | 5/1988 | Miyahara et al. | 385/75 |
| 4,762,389 | 8/1988 | Kaihara | 385/60 |
| 4,779,952 | 10/1988 | Hayashi et al. | 385/66 |
| 5,042,891 | 8/1991 | Mulholland et al. | 385/93 |
| 5,101,463 | 3/1992 | Cubukciyan et al. | 385/72 |
| 5,109,453 | 4/1992 | Edwards et al. | 385/90 |
| 5,434,941 | 7/1995 | Bechtel et al. | 385/94 |
| 5,577,145 | 11/1996 | Musk | 385/88 |
| 5,642,450 | 6/1997 | Oda | 385/60 |
| 5,684,903 | 11/1997 | Kyomasu et al. | 385/93 |
| 5,802,230 | 9/1998 | Kuribayashi et al. | 385/92 |
| 5,887,095 | 3/1999 | Nagase et al. | 385/58 |
| 5,936,263 | 8/1999 | Hashizume | 257/98 |
| 5,993,070 | 11/1999 | Tamekuni et al. | 385/65 |

OTHER PUBLICATIONS

Miyata, S., et al., "SC–type Hybrid Optical Module integrating LD, PD and Coupler", IEICE 1997 Annual Meeting Abstract C–3–86, p. 195.

Kurata, K. et al., "Low Cost Optical Module Packaging Techniques for Optical Access Network Systems", IEICE Transactions on Electronics, vol. E80–C, No. 1, Jan. 1, 1997, pp. 98–106.

Houghton, A. J. N. et al., "Design Manufacture and Performance of Receptacle (Connectorised) Laser Diode Packages for 1.3–M and 1.55–M Fibre Systems", Proceedings of the Electronic Components and Technology Conference (ECTC), San Diego, May 18–20, 1992, pp. 624–629.

*Primary Examiner*—Rodney Bovernick
*Assistant Examiner*—Juliana K. Kang
*Attorney, Agent, or Firm*—Staas & Halsey LLP

[57] ABSTRACT

An optical receptacle module includes an optical module unit including therein an optical device and carrying a sleeve, a ferrule holder fitted into the sleeve and holding therein a ferrule, a frame member mounted on the ferrule holder, and an adapter unit mounted on the frame unit and accepting an external optical plug, wherein the ferrule holder having an engagement part for engagement with the frame at a location away from the optical device with respect to an engagement part of the frame member used for engagement with the adapter unit.

8 Claims, 10 Drawing Sheets

FIG. 10C

RECEPTACLE MODULE FOR OPTICAL TELECOMMUNICATION

BACKGROUND OF THE INVENTION

The present invention generally relates to optical receptacles and more particularly to an improvement of an optical receptacle for use in optical modules that form a home terminal of an optical subscriber system.

JIS (Japanese Industrial Standard) C5973 prescribes an optical plug known as SC-type for use in optical interconnection of optical fibers.

Figure 1A:
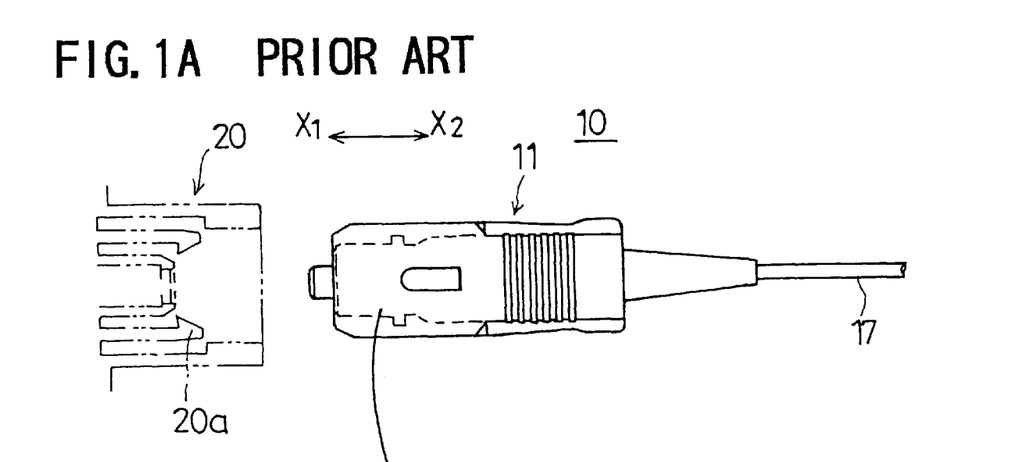
FIGS. 1A–1C are diagrams showing the construction of a standard optical plug.
Figure 1B:
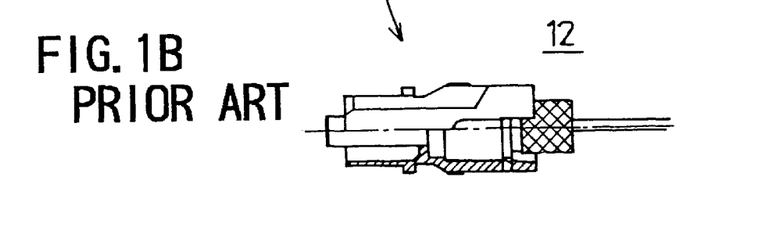
Figure 1C:
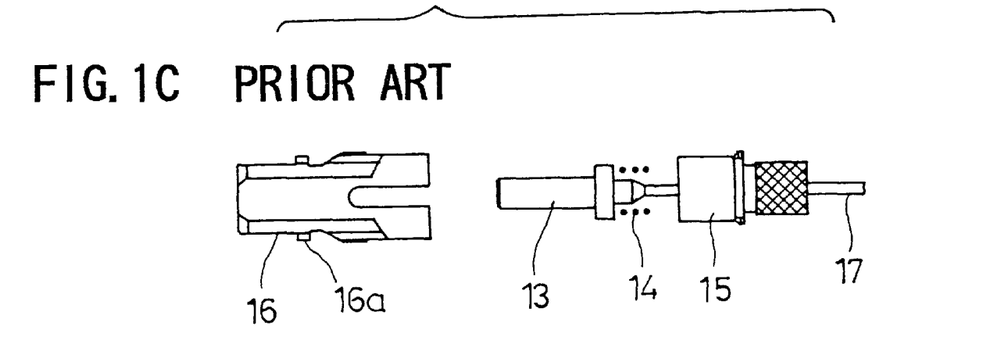

FIGS. 1A–1C show an optical plug 10 of the foregoing SC-type.

Referring to FIG. 1A, the optical plug 10 includes a generally rectangular housing 11 in which a plug assembly 12 shown in FIG. 1B is accommodated. The plug assembly 12, in turn, includes a frame 16 that engages with a ferrule holder 15 as indicated in FIG. 1C, wherein the ferrule holder 15 holds thereon a ferrule 13 with an intervening spring 14. The ferrule 13 protects an end of an optical fiber 17, and the optical fiber 17 extends away from the ferrule holder 15 to an external optical device. As indicated in FIG. 1A, the ferrule 13 is held such that a tip end of the ferrule 13 projects from an end of the housing 11. The ferrule 13 is thereby held resiliently by the spring 14 so as to be movable in the $X_1$- and $X_2$-directions indicated in FIG. 1A by arrows. Thereby, the ferrule 13 is urged in the $X_1$-direction by the exerting force of the spring 14.

It should be noted that the SC-type optical plug 10 is inserted into a corresponding optical receptacle. module 20 of the SC-type shown in FIG. 1A by a broken line, wherein it should be noted that a projection 16a provided on an outer peripheral surface of the frame 16 is held by a catch mechanism 20a provided in the optical receptacle module 20. As a result of the engagement of the projecting ferrule 13 with a corresponding ferrule provided in the optical receptacle module 20, the ferrule 13 is displaced resiliently in the $X_2$ direction with a small amount. Thus, the ferrule 13 is caused to make a contact with the corresponding ferrule of the optical receptacle module 20 when the optical plug 10 of the SC-type is connected to the optical receptacle module 20 of the SC-type.

In view of the fact that the foregoing optical plug of the SC-type as prescribed in JIS C5973 is used extensively for interconnection of optical fibers, it is desired that the foregoing optical receptacle module of the SC-type, designed for use with the SC-type optical plug, is used also in optical modules of home terminals that form a part of an optical subscriber system, such that an external optical fiber is terminated at the SC-type receptacle module.

Further, in view of the fact that there is a stringent demand of low cost for the optical modules for home terminal applications, there is a stringent demand also in the cost of the optical receptacle modules of the SC-type for use in such home optical modules. In addition, the optical receptacle modules for home applications are required to have a compact size in conformity with the requirement of compact size of the home optical modules.

Figure 2:
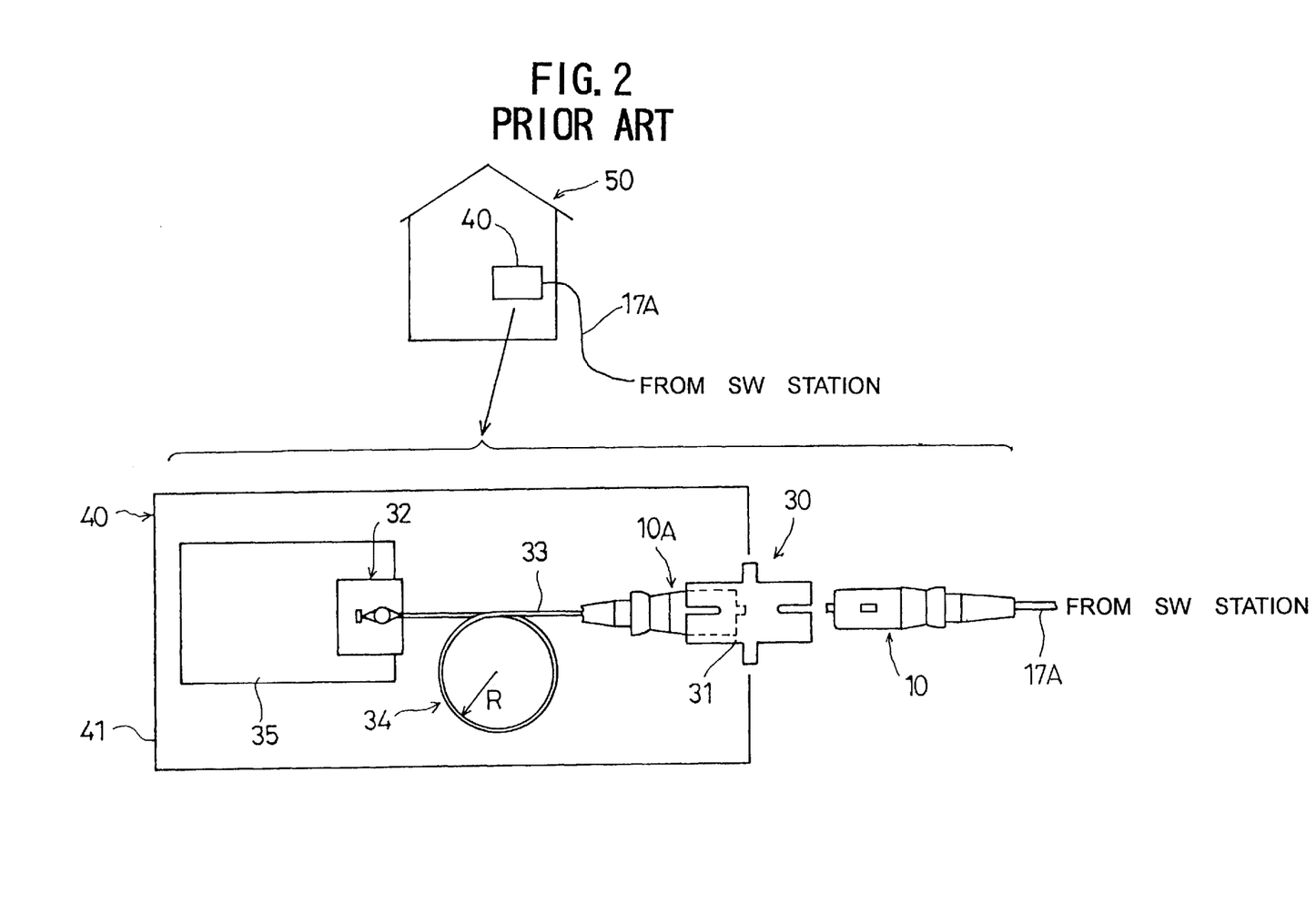
FIG. 2 is a diagram showing the construction of an optical home terminal that forms a part of an optical subscriber system.

FIG. 2 shows a home optical module 40 that includes a conventional optical receptacle 30 of the SC-type.

Referring to FIG. 2, the home optical module 40 forms an optical subscriber system and is provided in a home 50 for terminating an optical fiber 17A that extends from an exchange station not illustrated, wherein it should be noted that the optical fiber 17A carries the optical plug 10 of the SC-type at an end thereof and the optical plug 10 thus provided is accepted by the optical receptacle 30.

Conventionally, the optical receptacle 30 of the SC-type includes an optical plug 10A identical in construction to the SC plug 10 of the SC-type and an adapter unit 31 accepting the optical plug 10A as indicated in FIG. 2, wherein the adapter unit 31 is designed to accept the optical plug 10 to which the external optical fiber 17A is connected. FIG. 2 further shows a separate optical device module 32 that includes therein various optical devices such as a laser diode, wherein the receptacle 30 and the optical device module 32 are connected with each other by an optical fiber 33. The optical fiber 33 has an excessive length and is coiled to form a loop 34 having a predetermined radius R. The optical device module 32 is mounted on a circuit board 35 carrying thereon various circuits for signal processing.

It should be noted that optical receptacle 30, optical fiber 22, optical module 32 and the printed circuit board 35, forming together the home optical module 40, are accommodated in a case 41. Thus, the assembling of the home optical module 40 includes a process of winding the optical fiber 33 to form the loop 34 in the case 41, while such a process takes time and increases the cost of the home optical module 40 thus formed. Further, because of the existence of the optical fiber 33 forming the coil 34, it has been difficult to reduce the size of the home optical module 40.

SUMMARY OF THE INVENTION

Accordingly, it is a general object of the present invention to provide a novel and useful optical receptacle module wherein the foregoing problems are eliminated.

Another and more specific object of the present invention is to provide a compact optical receptacle module easy for assembling and suitable for use in home optical modules.

Another object of the present invention is to provide an optical receptacle module, comprising:

an optical module unit including an optical device in a body of said optical module unit, said optical module unit further having a sleeve part as an integral body with said body of said optical module unit;

a ferrule holder provided on said optical module unit so as to engage said sleeve part, said ferrule holder holding therein a ferrule in a state such that said ferrule has an end projecting from said ferrule holder at an end of said ferrule holder away from said optical device;

a frame member mounted on said ferrule holder, said frame member including a first engaging part for engaging a corresponding second engaging part formed on said ferrule holder; and an adapter unit mounted on said frame member so as to hold said exposed end of said ferrule, said adapter unit having a first sleeve part holding therein said exposed end of said ferrule and a second, opposite sleeve part adapted for accepting a ferrule of an external optical plug, said adapter unit further having a third engaging part for engaging a corresponding fourth engaging part provided on said frame member.

Another object of the present invention is to provide an optical receptacle, comprising:

an optical module unit including an optical device in a body of said optical module unit, said optical module unit further having a sleeve part as an integral body with said body of said optical module unit;

a ferrule holder provided on said optical module unit so as to engage said sleeve part, said ferrule holder holding therein a ferrule in a state such that said ferrule has an end projecting from said ferrule holder at an end of said ferrule holder away from said optical device; and a frame member mounted on said ferrule holder, said frame member including a first engaging part for engaging a corresponding second engaging part provided on said ferrule holder, said frame member being thereby mounted on said ferrule holder in a state that said first engaging part engages said second engaging part;

said first and second engaging parts engaging with each other at a location offset in a direction away from said optical device with respect a projection formed on said frame member for engagement with an adapter unit used to accept a standard optical plug.

Another object of the present invention is to provide an optical module, comprising:

an optical receptacle, comprising: an optical module unit including an optical device in a body of said optical module unit, said optical module unit further having a sleeve part as an integral body with said body of said optical module unit; a ferrule holder provided on said optical module unit so as to engage said sleeve part, said ferrule holder holding therein a ferrule in a state such that said ferrule has an end projecting from said ferrule holder at an end of said ferrule holder away from said optical device; a frame member mounted on said ferrule holder, said frame member including a first engaging part for engaging a corresponding second engaging part formed on said ferrule holder;

an adapter unit mounted on said frame member of said optical receptacle so as to hold said exposed end of said ferrule, said adapter unit having a first sleeve part holding therein said exposed end of said ferrule and a second, opposite sleeve part adapted for accepting a ferrule of an external optical plug, said adapter unit further having a third engaging part for engaging a corresponding fourth engaging part provided on said frame member; and a metal case holding therein said optical receptacle module in such a state that said optical receptacle is spatially separated from said metal case.

According to the present invention, the ferrule and the optical device in the optical module unit are held as an integral body. Thereby, the optical fiber connection between the ferrule and the optical device is successfully eliminated, and the size of the optical receptacle module is reduced substantially. Particularly, the length of the ferrule and hence the size of the optical receptacle module can be reduced further by providing the first and second engaging parts to be located offset in a direction away from the optical device with respect to the location in which the third and fourth engaging parts engage with each other.

Other objects and further features of the present invention will become apparent from the following detailed description when read in conjunction with the attached drawings.

DETAILED DESCRIPTION OF THE PREFERRED EMBODIMENTS

FIRST EMBODIMENT

Figures 3A, 3B:
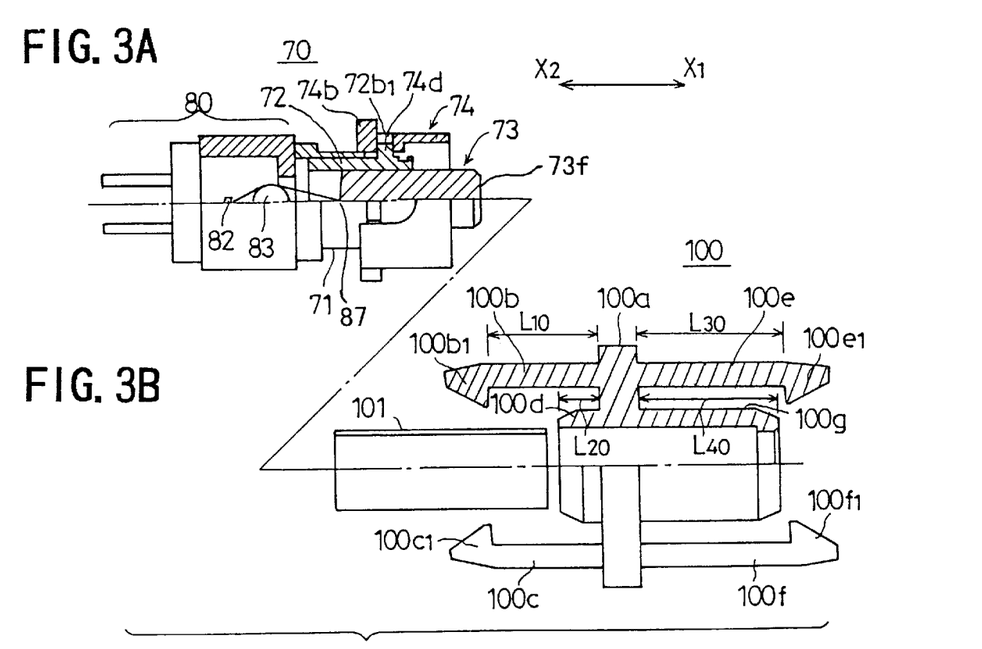
FIGS. 3A–3C are diagrams showing the construction of an optical receptacle module according to a first embodiment of the present invention.
Figure 3C:
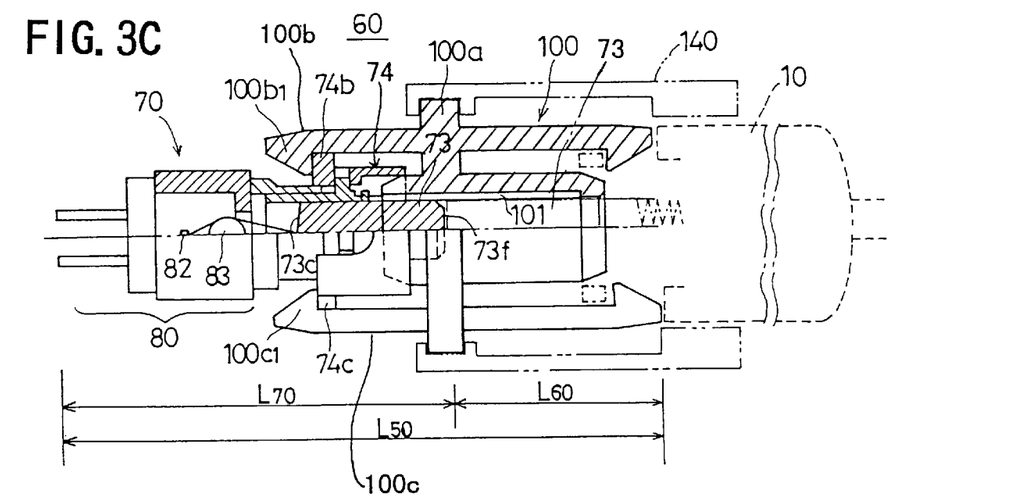
Figure 4:
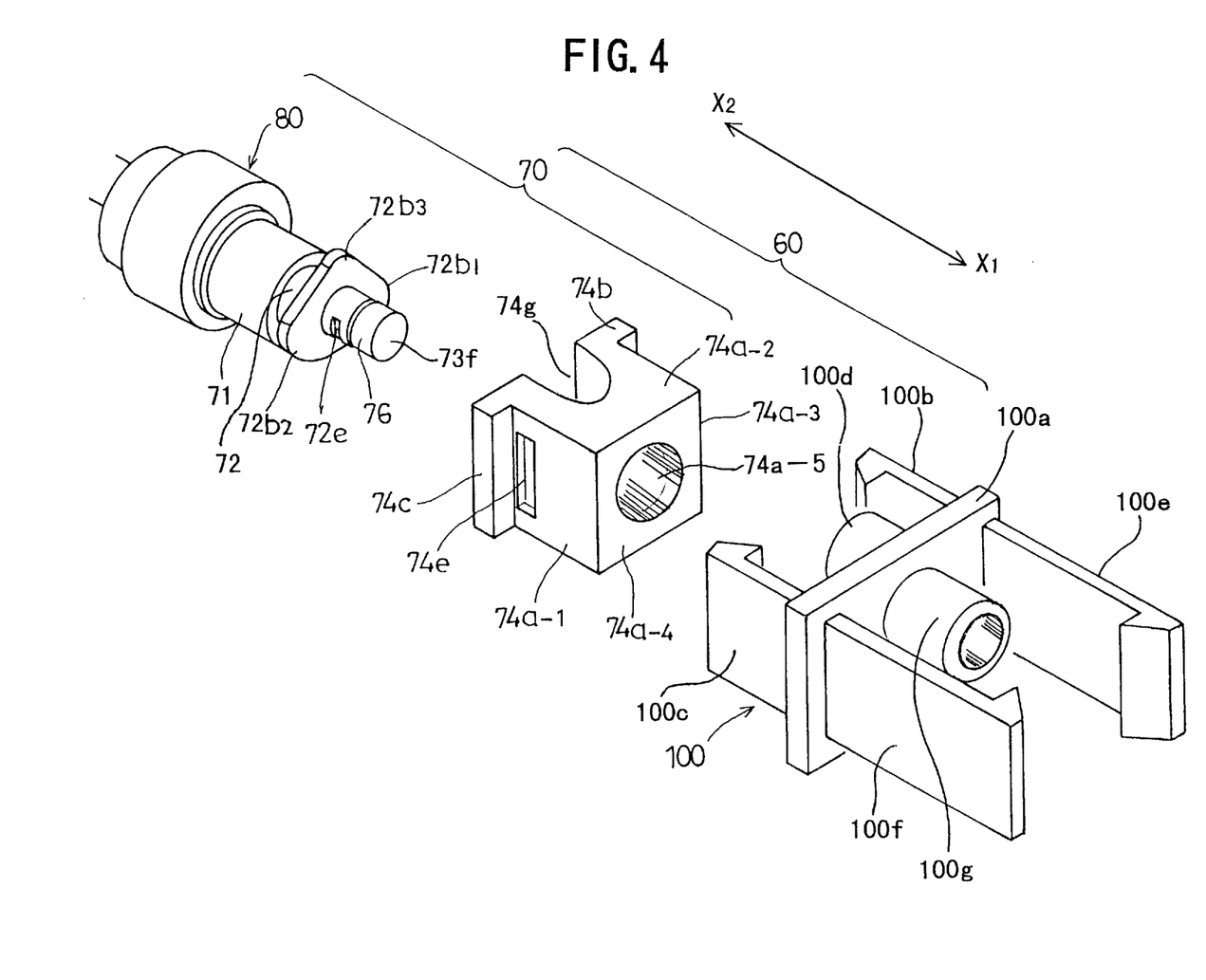
FIG. 4 is a diagram showing the optical receptacle module of the first embodiment in an oblique view.

FIGS. 3A–3C show the construction of an optical receptacle module 60 according to a first embodiment of the present invention for use in combination with an external optical plug of the SC-type. Further, FIG. 4 shows the optical receptacle module in an exploded view.

Referring to the drawings, the optical receptacle module 60 is generally formed of an optical receptacle 70 including an optical module unit 80 and a frame member 74 mounted on the optical module unit 80 as indicated in FIG. 3A, and an adapter unit 100 shown in FIG. 3B is mounted on the frame member 74 on the optical module unit 80. The adapter unit 100 includes a split sleeve member 101. In FIG. 3A, it should be noted that the arrow $X_2$ designates the direction in which an external SC-type optical plug is inserted, while the arrow $X_1$ designates the direction in which the optical plug is pulled out. The optical receptacle 70 and the adapter unit 100 are assembled as indicated in FIG. 3C so as to accept the SC-type optical plug. In the illustrated example, the end surface 73f of the ferrule 73 facing the direction $X_1$ is located generally at a central part 100a of the adapter unit 100.

Hereinafter, description will be made on the optical receptacle 70 with reference to FIGS. 5A–5D.

Figure 5A:
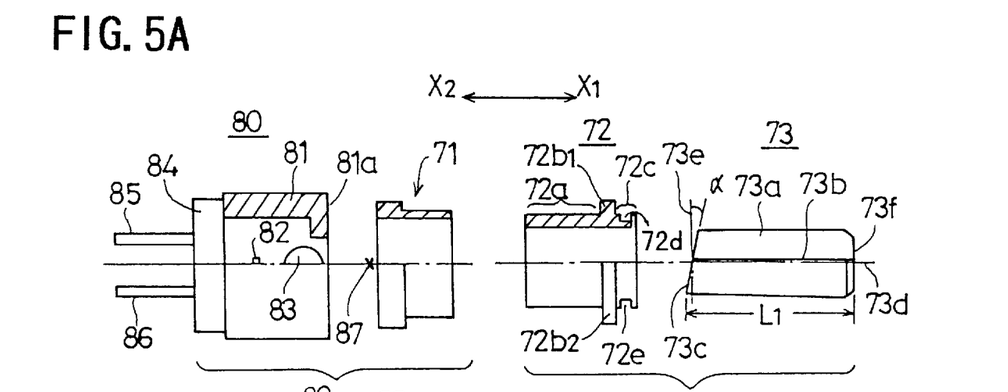
FIGS. 5A–5D are diagrams showing the assembling process of the optical receptacle module of the first embodiment.
Figure 5B:
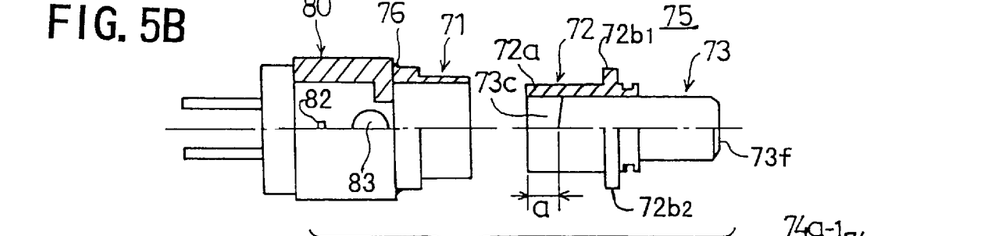

Referring to FIG. 5A, the optical receptacle 70 forms a structure in which a ferrule 73 is held as an integral body with the optical module unit 80 and includes, in addition to the optical module unit 80 and the ferrule 73, a sleeve 71 formed integrally with the optical module unit 80, a ferrule holder 72 fitted into the sleeve 72 and the frame member 74 mounted on the ferrule holder 71, wherein the ferrule holder 71 holds therein the ferrule 73.

The optical module unit 80 includes a generally cylindrical metal housing 81, wherein the metal housing 81 in turn includes therein a laser diode 82 and a photodiode (not shown). The metal housing 81 further includes a spherical lens 83 as an optical coupler element of the laser diode 82 and the photodiode. Further, the metal housing 81 is closed, at the side facing the $X_2$-direction, by a stem 84, and leads 85 and 86 are provided so as to penetrate through the stem 84, wherein the leads 85 and 86 extend in the $X_2$-direction from the stem 84 and form an electrode terminal of the laser diode 82 or the photodiode in the housing 81. It should be noted that the spherical lens 83 is disposed such that the optical beam emitted by the laser diode 82 is focused by the spherical lens 83 at a focusing point 87. It should be noted that the optical module unit 80 and the ferrule 73 are disposed in a relationship such that the foregoing focusing point 87 is coincident to the end surface 73c of the ferrule 73 at the side facing the $X_2$-direction.

The sleeve 81 is formed of a metal and has a cylindrical shape. The sleeve 81 is thereby welded upon an end surface 81a of the housing 81 facing the $X_1$-direction by a laser beam welding process at a welding point 78. It should be noted that the sleeve 87 acts as a positioning guide of the ferrule 73 that form a ferrule assembly 75 together with the ferrule holder 72.

It should be noted that the ferrule holder 72 is formed of a metal and includes a cylindrical part 72a having a size suitable for press-fitting into the sleeve 71, wherein a flange part 72b is formed near an end of the cylindrical part 72a facing the $X_1$-direction. The flange part 72b forms a collar and the cylindrical part 72a extends further in the $X_1$-direction to form a continuous cylindrical part 72c, wherein the continuous cylindrical part 72c is formed with depressions or grooves 72d and 72e for engagement with an optical connector at the time of optical alignment process as will be explained with reference to FIG. 6.

Figure 6:
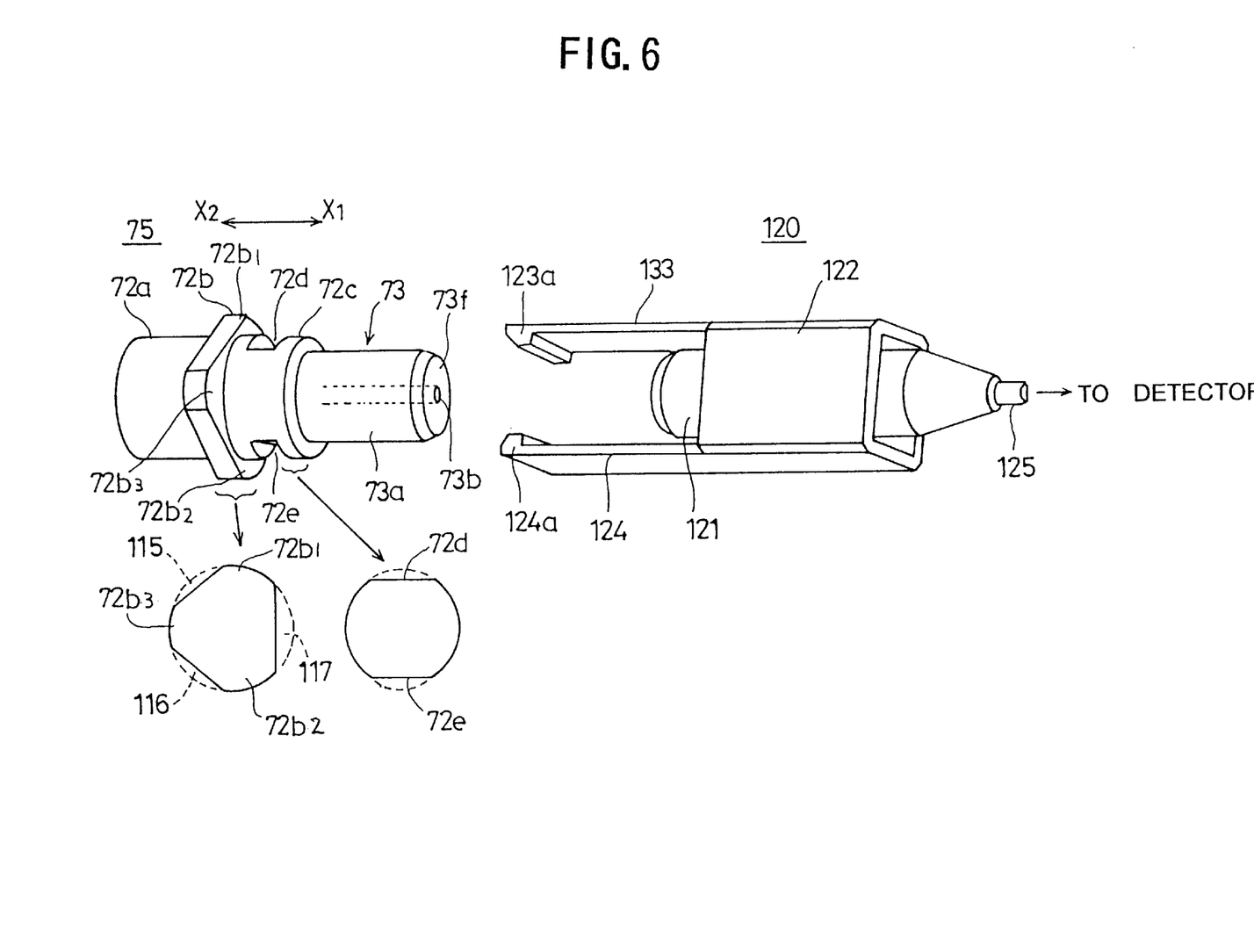
FIG. 6 is a diagram showing the optical receptacle module of the first embodiment in the state connected to an optical plug used for optical alignment.

It should be noted that the flange part 72b has a generally disc-shaped form with a part thereof removed by cutout as indicated in FIG. 6. Thus, the flange part 72b is formed of projections $72b_1$–$72b_3$ laterally projecting from the cylindrical surface 72a. In the upper illustration of FIG. 6, it can be seen that the projections $72b_1$ and $72b_2$ project in the upward direction and downward direction respectively from the cylindrical body 72a.

As indicated in FIG. 5A or FIG. 6, the ferrule 73 holds an optical fiber 73b in a capillary 73a formed generally at a center of the ferrule 73 and has a length $L_1$ of about 6 mm. As will be explained later, this length $L_1$ is substantially smaller than the case of the second or third embodiment of the present invention.

It should be noted that an end surface 73c of the ferrule 73 facing the $X_2$-direction is slanted with an angle α with respect to the plane 73e perpendicular to the central optical axis 73d of the ferrule 73. See FIG. 5A. Thereby, the opposite end surface, the surface 73f, of the ferrule 73 facing in the $X_1$ direction is perpendicular to the central axis 73d of the ferrule 73.

It should be noted that the ferrule 73 is press-fitted into the ferrule holder 72 from the side of the sleeve 72c and fixed therein in the state that the end surface 73c is located deeply inside the ferrule holder 72. On the other hand, the insertion of the ferrule 73 into the ferrule holder 72 is conducted only partially such that the end surface 73c of the ferrule 73 facing the $X_2$-direction is displaced with a distance a from the end of the ferrule holder 72 facing the $X_1$-direction. As a result, the opposite end surface of the ferrule 73 facing the $X_1$-direction is exposed outside the ferrule holder 72. This construction contributes to the advantageous feature of the present invention to reduce the length of the ferrule 73 as will be explained later.

The ferrule assembly 75 is thereby formed by press-fitting the cylindrical part 72a of the ferrule holder 72 into the sleeve 71 such that the end surface 73c is located at a position coincident to the focusing point 87 of the lens 83. See FIG. 3C. The end of the sleeve 71 facing the $X_2$-direction and the cylindrical part 72a are welded at a welding point 78 by means of a laser beam.

In the foregoing process of mounting the ferrule assembly 75 in the sleeve 71 of the optical module unit 80, an optical connector 120 shown in FIG. 6 is attached to the ferrule assembly 75 by urging the connector 120 in the $X_2$-direction, wherein the optical connector 120 is used for measuring the intensity of the optical beam emitted by the laser diode 82 and guided along an optical fiber 125 to an optical detector not illustrated. Thereby, the position of the ferrule assembly 75 is moved in the $X_1$- and $X_2$-directions in search of the optimum optical alignment position in which the efficiency of optical coupling is maximized. The laser welding of the ferrule assembly 75 is conducted at the optimum alignment position thus achieved by using a laser beam directed obliquely to the cylindrical part 72a in the $X_2$-direction.

As indicated in FIG. 6, the optical connector 120 used for the optical intensity measurement is provided at an end of the optical fiber 125 extending from the optical detector not illustrated, wherein the optical connector 120 includes a ferrule 121 holding the end part of the optical fiber 125 and a housing 122 accommodating therein the ferrule 121. The housing 122 further includes a pair of arms 123 and 124 extending generally parallel with each other, wherein the arm 123 carries a catch claw 123a at a tip end thereof. Similarly, the arm 124 carries a catch claw 124a at a tip end thereof. Thereby, the catch claws 123a and 124a engage the corresponding cutouts 72d and 72e formed on the ferrule assembly 75 upon the engagement of the optical connector 125 with the ferrule assembly 75, and the ferrule 121 of the optical connector 121 is abutted with the ferrule 73 in the foregoing state in which the optical connector 120 is engaged with the ferrule assembly 75.

It should be noted that the flange part 72b has a shape of a disk from which a part thereof is cut out as noted before. FIG. 6 shows such cutout parts 115, 116 and 117. As a result of the formation of the cutout parts 115, 116 and 117, there are formed the projecting parts $72b_1$, $72_2$ and $72_3$ in the flange 72b as noted before. By providing the cutout parts 115, 116 and 117, the laser beam traveling generally in the $X_2$-direction and used for the laser beam welding process can be directed to the welding point 78 without being blocked or interrupted. It should be noted that the welding point 78 is located immediately behind the flange part 72b.

The frame member 74 is formed of an insulating resin and includes a generally rectangular main body 74a in which a cylindrical space $74a_{-5}$ is formed so as to extend in the $X_1$–$X_2$-directions as indicated in FIG. 4. The main body 74a is surrounded by four co-planar surfaces $74a_{-1}$–$74a_{-4}$, wherein two of the mutually opposing surfaces $74a_{-1}$ and $74a_{-3}$ thereof are formed with lateral projections or ears 74c and 74b respectively used for holding the adapter unit 100. Further, the foregoing surfaces $74a_{-1}$ and $74a_{-3}$ are formed with the elongate cutouts 74e and 74d respectively, wherein the cutouts 74e and 74d are used for holding the ferrule holder 72. Further, the remaining surfaces $74a_{-2}$ and $74a_{-4}$ are formed with U-shaped cutouts 74f and 74g. See also FIG. 5C.

In the construction of FIG. 6, it should be noted that the foregoing lateral projections 74b and 74c are formed at the end part of the main body 74a facing the $X_2$-direction and project outwardly in the lateral direction. Further, the construction of FIG. 6 has a feature in that the elongate cutouts 74d and 74e are formed adjacent to the foregoing lateral projections 74b and 74c at a position offset from the lateral projections 74b and 74c in the $X_1$-direction. It should be noted that this feature also contributes to the reduction in the length of the ferrule 73. The U-shaped openings 74f and 74g are opened in the $X_2$-direction at the end of the main body 74a facing the $X_2$-direction.

When mounting the frame member 74 on the ferrule assembly 75, the main body 74a of the frame member 74 is deformed elastically so as to extend the U-shaped openings 74f and 74g, and the elongate cutouts 74d and 74e engage the lateral projections $72b_1$ and $72b_2$. In this state, the main body 74a accommodates the sleeve 71 of the optical module unit 80 in the cylindrical space $74a_{-5}$ formed therein, and the end surface 73f of the ferrule 73 in the $X_1$-direction projects in the $X_1$-direction from the end surface of the frame member 74 facing the $X_1$-direction. See FIG. 3A or FIG. 5D.

Figure 5C:
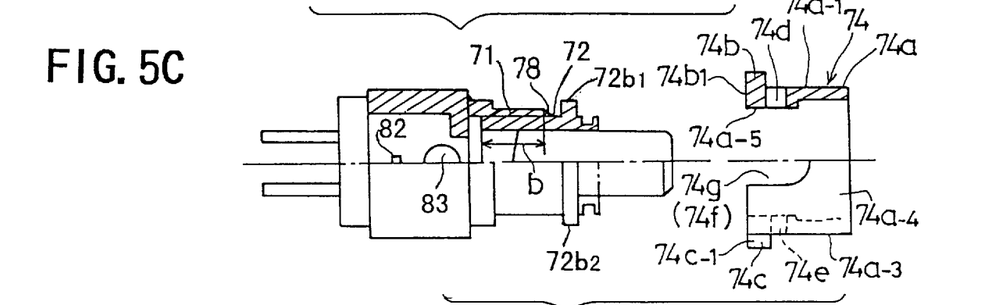
Figure 5D:
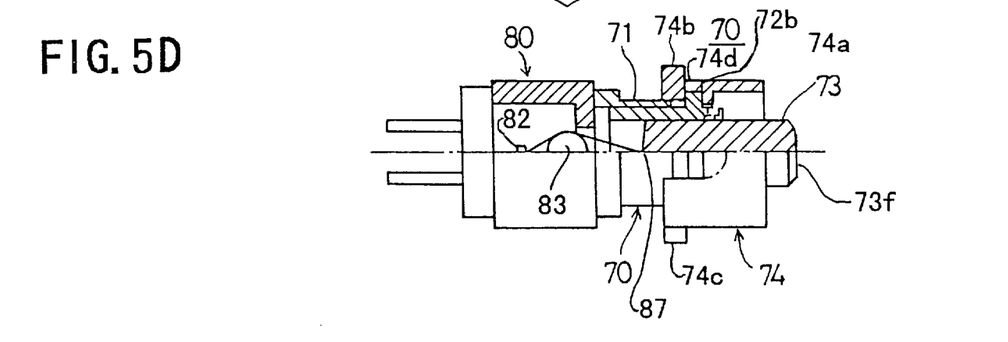

In the state of FIG. 3A or FIG. 5D, it should be noted that the projections $72b_1$ and $72b_2$ are located adjacent to the lateral projection 74b or 74c of the frame member 74 at the side offset in the $X_1$-direction. Thereby, the length of the ferrule 73 can be reduced as will be explained in detail later.

Next, a description will be made on the adapter unit 100.

Referring to FIGS. 3A–3D or FIG. 4, the adapter unit 100 is formed of an insulating material or a synthetic resin having a resistivity of about 100 kΩcm and includes a plate-like main body forming the central part 100a from which a first arm pair including catch arms 100b and 100c extend in the $X_2$-direction in a parallel relationship with each other. Similarly,. a second arm pair including catch arms 100e and 100f extend from the main body 100a in the $X_1$-direction in a parallel relationship with each other. Further, a first sleeve 100d extend from the main body 100a in the $X_2$-direction between the catch arms 100b and 100c and a second sleeve 100g extend from the main body 199a in the $X_1$-direction between the catch arms 100e and 100f. In the illustrated example, it should be noted that the catch arm 100b is aligned with the catch arm 100e in a co-linear relationship and the catch arm 100c is aligned with the catch arm 100f also in a co-linear relationship. Further, the sleeve 100d is aligned in a co-linear relationship with the sleeve 100g.

As indicated in FIG. 3B, the catch arm 100b carries a catch claw $100b_1$ at a free end thereof for engagement with the lateral projection 74b of the frame member in the state of FIG. 3C in which the adapter unit 100 is mounted on the frame member 74. Similarly, the catch arm 100c carries a catch claw $100c_1$ at a free end thereof for engagement with the lateral projection 74c of the frame member 74. Further, the catch arms 100e and 100f carry catch claws $100e_1$ and $100f_1$ for engagement with the standard optical plug 10 of the SC-type as indicated in FIG. 3C.

Referring to FIG. 3C, it should be noted that the catch arms 100b and 100c has a length $L_{10}$ set such that the end surface 73f of the ferrule 73 is located coincident to the central main body 100a of the adapter unit 100 in the state that the catch claws $100b_1$ and $100c_1$ are engaged with the corresponding projections 74b and 74c of the frame member 74. It should be noted that the first sleeve 100d has a length $L_{20}$ set such that the first sleeve 100d engages the main body 74a of the frame member 74 in the state that the catch claws $100b_1$ and $100c_1$ engage the corresponding projections 74b and 74c of the frame member 74. In this state, the first sleeve 100d accommodates therein the end of the ferrule 73 including the end surface 73f and projecting from the frame member 74. Further, the catch arms 100e and 100f have a length $L_{30}$ set so as to accept the foregoing standard optical plug 10 of the SC-type, and the second sleeve 100g has a length $L_{40}$ set also for accepting the standard optical plug 10. The length $L_{20}$ is substantially smaller than the length $L_{30}$.

As explained heretofore and as indicated in FIG. 3C, the receptacle module 60 includes the adapter unit 100 mounted on the optical receptacle 70 in the state that the catch claws 100b, and 100c, engage the corresponding projections 74b and 74c of the frame member 74 mounted on the optical module unit 80 to form the optical receptacle 70. In the state of FIG. 3C, it should be noted that first sleeve 100d abuts the main body 74a of the frame member 74 and accepts the ferrule 73 into the space formed inside the first sleeve 100d, with an intervening split sleeve 101 interposed between the first sleeve 100d and the ferrule 73. The split sleeve 101 is used for aligning a ferrule 13 of the optical plug 10 and the ferrule 73 of the receptacle module 60. It should be noted that the split sleeve 101 is fixed on the ferrule 73 so as to cover the outer periphery thereof close to the end surface 73f, wherein the split sleeve 101 extends through both the first sleeve 100d and the second sleeve 100g. In the construction of FIG. 3C, it can be seen that end surface 73f of the ferrule 73 is located coincident to the central main body 100a of the adapter unit 100.

Figure 7A:
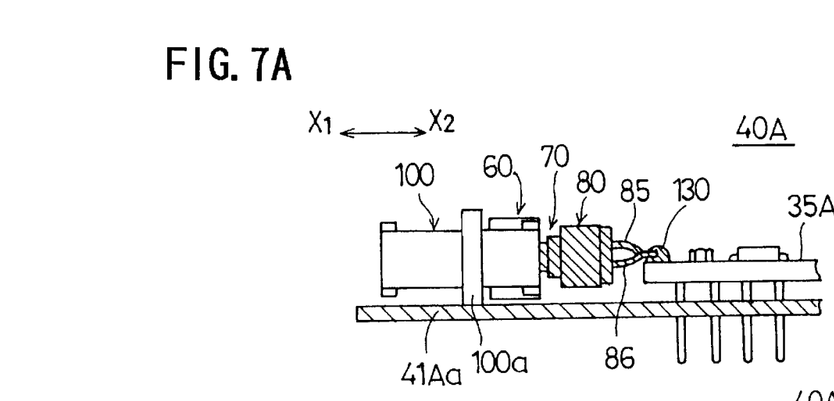
FIGS. 7A–7C are diagrams showing the construction of a home optical terminal that uses the optical receptacle module of the present invention.
Figure 7B:
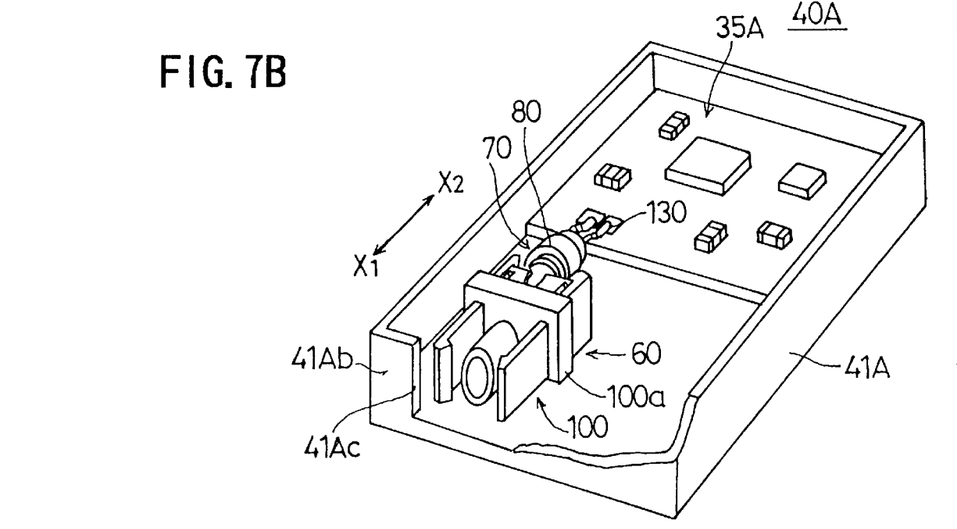
Figure 7C:
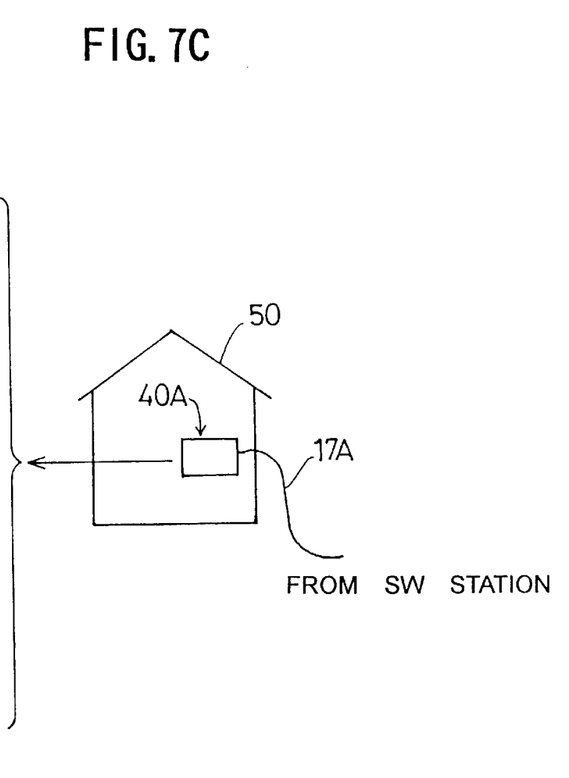

The receptacle module 60 of the foregoing construction is accommodated into a home optical terminal 40A as indicated in FIG. 7C, wherein the home optical terminal 40A constitutes a part of the optical subscriber system including the home 50. The optical terminal 40A has a metal case 41A similar to the conventional optical terminal 40 of FIG. 2 and includes the optical receptacle module 60 and a printed circuit board 35A for signal processing. By using the optical receptacle module 60 in the optical terminal 40A, it is no longer necessary to coil the excessive length of the optical fiber and the size of the optical terminal 40A can be reduced substantially. Associated with the elimination of the optical fiber coil, the optical terminal 40A can be manufactured easily.

Referring to FIGS. 7A and 7B, it should be noted that the receptacle module 60 is mounted on a bottom plate 41Aa of the case 41A by engaging the central main body 100a of the adapter unit 100 formed of an insulating synthetic resin and by soldering the terminals 85 and 86 to the printed circuit board 35A by a solder alloy. In this state, it should be noted that the optical receptacle 70, made of a metal, is held above the bottom plate 41Aa of the case 41A as indicated in FIG. 7A, wherein it can be seen that the optical receptacle module 60 is disposed in such an orientation that the adapter unit 100 is exposed by a cutout 41Ac formed in a side plate 41Ab of the case 41A. Thereby, the standard optical plug 10 of the SC-type provided at an end of an optical fiber 17A, which in turn extends from an exchange station not illustrated, is inserted into the optical receptacle module 60.

As indicated in FIG. 3A or 3C, the optical beam emitted by the laser diode 82 is focused by the spherical lens 83 and injected into the ferrule 73 at the end surface 73c, wherein the optical beam is then injected into the optical fiber 17A at the optical connector 10 and is lead to the exchange station. The optical beam from the exchange station, on the other hand, is injected from the optical fiber 17A to the ferrule 73 at the optical connector 10 and is emitted at the end surface 73c. The optical beam thus emitted is then captured by the spherical lens 83 and is focused to the photodiode not illustrated.

Next, the advantageous features of the optical receptacle module 60 of the present embodiment will be described.

A. The optical receptacle module 60 includes the optical module unit 80 as an integral body Because of this feature, it is no longer necessary to coil the excessive optical fiber in the case of the home optical module 40A. Thereby, the assembling of the optical module 40A is simplified substantially and the size of the optical module 40A can be reduced significantly.

B. The length $L_1$ of the ferrule 73 can be reduced

In a first aspect, it should be noted that the projections $72b_1$ and $72b_2$ of the flange part 72b engage the elongate cutouts 74d and 74e of the holder unit 74 at a position offset in the $X_1$-direction with respect to the projections $74b_1$ and $74b_2$ of the frame member 74. In correspondence to this, the ferrule 73 is located also in offset in the $X_1$-direction by the distance a. As the position of the end surface 73f of the ferrule 73, which is adapted for engagement with the ferrule 13 of the standard optical plug 10 of the SC-type, is determined and cannot be moved from the position of the central main body 100a of the adapter unit 100, this means that the length $L_1$ of the ferrule 73 is reduced as compared with the case in which the projections $72b_1$ and $72b_2$ are located behind the projections $74b_1$ and $74c_1$ in the $X_2$-direction. Associated with the reduction of the length $L_1$ of the ferrule 73, it should be noted that the length $L_{20}$ of the first sleeve 100d becomes smaller than the length $L_{40}$ of the second sleeve 100g, as noted previously.

As a result of the reduced length of the ferrule 73, the following advantageous effects are obtained.

a) The overall length $L_{50}$ of the receptacle module 60 can be reduced.

In view of the fact that the part of the adapter unit 100 at the side of the $X_1$-direction with respect to the central main body 100a is used for accepting the standard optical plug 10 of the SC-type, the length $L_{60}$ (see FIG. 3C) for this part of the adapter unit 100 cannot be reduced. On the other hand, the length $L_{70}$ of the part of the adapter unit 100 located at the side of the $X_2$-direction with respect to the main body 100a can be reduced by an amount corresponding to the foregoing distance a. Thereby, the overall length $L_{50}$ of the optical receptacle module 60 can be reduced.

b) The cost of the ferrule 73 can be reduced.

In view of the fact that the ferrule 73 holds the optical fiber 73b in the capillary 73a as indicated in FIG. 5A or FIG. 6, the reduction of the length $L_1$ of the ferrule 73 to about 6 mm, for example, substantially facilitates the process of manufacturing the ferrule 73 by inserting the optical fiber 73b into the capillary 73a.

c) The size of the mode optical terminal 40A can be reduced.

C. Laser diode and photodiode operate stably

It should be noted that the optical receptacle 70 formed of metal is provided with a separation from the bottom plate 41Aa of the case 41A of the optical terminal 40A. Thereby, the laser diode 82 and the photodiode (not illustrated) of the optical module unit 80 are successfully insulated from the metal case 41A, and a reliable operation is guaranteed for the laser diode 82 and the photodiode.

D. Operation of laser diode is not affected by the optical reflection at the ferrule end surface As the end surface 73c of the ferrule 73 is slanted with respect to the plane 73e perpendicular to the central axis 73d of the ferrule 73 with the angle α as indicated in FIG. 5A, the problem of the optical beam emitted by the laser diode 82 and returning to the laser diode 82 after reflection at the end surface 73c and associated instability of operation of the laser diode 82 is successfully avoided.

E. Efficient injection of the optical beam into the ferrule

By using the optical connector 120 shown in FIG. 6, it is possible to connect the external optical detector to the ferrule assembly 75 easily and quickly. Thus, it is possible to optimize the efficiency of optical coupling between the laser diode 82 and the ferrule 73 such that the optical beam emitted by the laser diode 82 is injected into the ferrule 73, more specifically the optical beam 73b held in the capillary 73a of the ferrule 73, with a maximum efficiency.

F. Ferrule assembly has a disc-shaped projection partially cut out for facilitating laser welding As indicated in FIG. 4 or FIG. 6, the flange part 72b forming a collar member of the ferrule assembly 75 for engaging the catch arms 100b and 100c of the adapter unit 100, has a generally disc-shaped form with a part thereof cut out at the cutouts 115, 116 and 117. By doing so, the flange part 72b does not block or interrupt the laser beam used for welding the ferrule holder 72 to the sleeve 71 of the optical module unit 80, and it becomes possible to weld the ferrule holder 72 to the sleeve 71 at the welding point 78 just behind the flange part 72b of the ferrule holder 72 as indicated in FIG. 5C. As the welding point 78 is formed very close to the flange part 72b, it is possible to secure a sufficient length b for the ferrule holder 72 to hold the ferrule 73 therein, and the ferrule 73 is held stably in the ferrule holder 72.

Figure 8A:
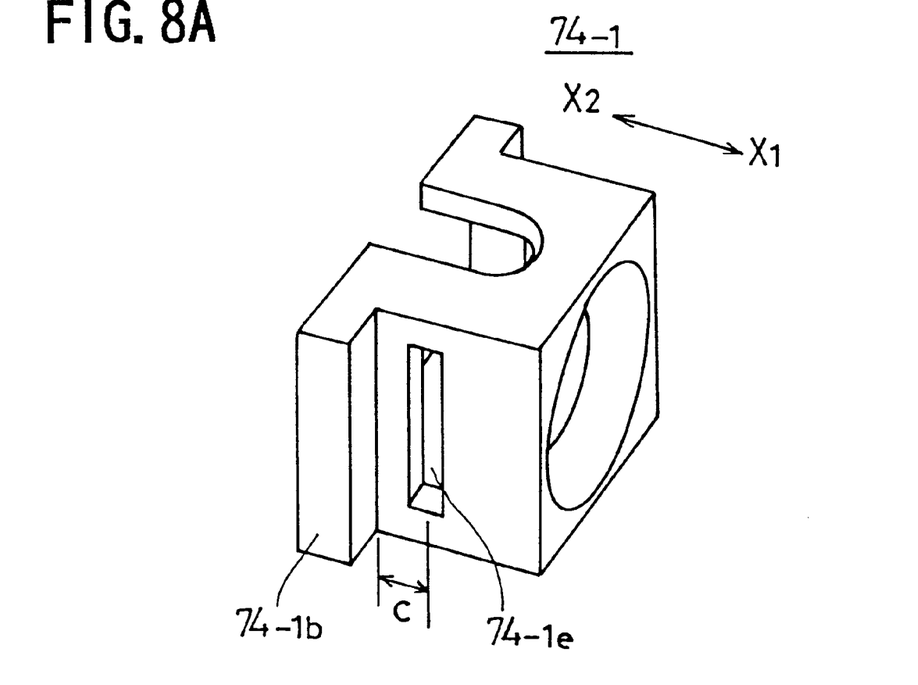
FIGS. 8A–8B are diagram showing various modifications of the optical receptacle module of the first embodiment.
Figure 8B:
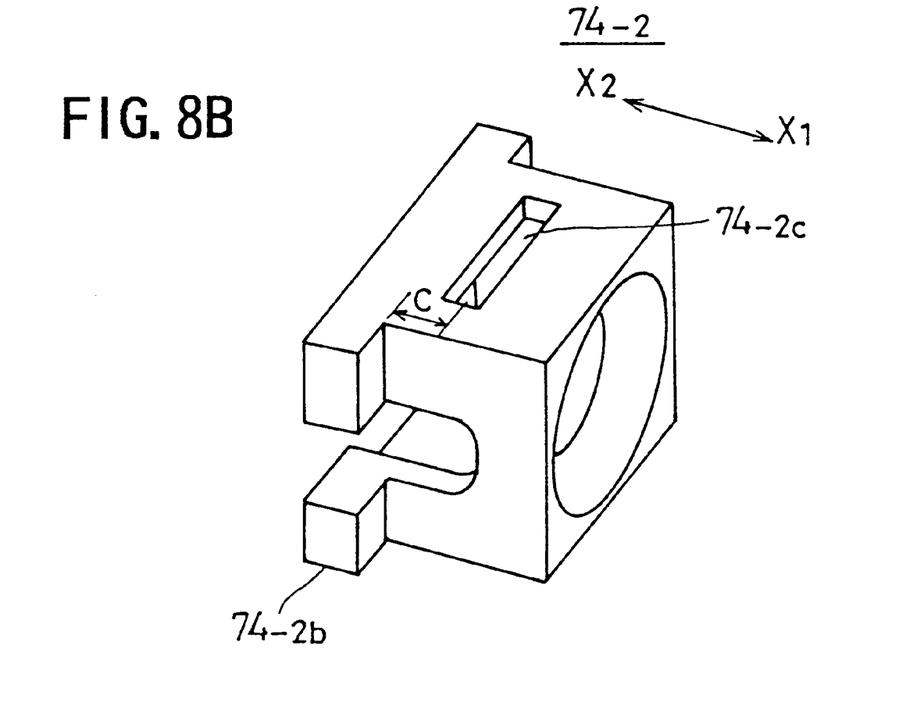

FIGS. 8A and 8B show a modification of the frame 74.

Referring to FIG. 8A, a frame $74_{-1}$ has a construction similar to that of the frame 74 except that there is provided an elongate cutout $74_{-1e}$ at a position offset in the $X_1$-direction from a lateral projection $74_{-1b}$, corresponding to the lateral projection 74b of the frame 74, with a distance c. By offsetting the position of the elongate cutout $74_{-1e}$ further in the $X_1$-direction as indicated in FIG. 8A, it is possible to reduce the length $L_1$ of the ferrule 73 further.

In the modification of FIG. 8B, a frame $74_{-2}$ corresponding to the frame 74 has an elongate cutout $74_{-2c}$ on a top surface different from the lateral surface on which a lateral projection $74_{-2b}$ is formed in correspondence to the lateral projection 74b. By forming the elongate cutout $74_{-2c}$ with the offset c in the $X_1$-direction similarly to the embodiment of FIG. 8A, it is possible to reduce the length $L_1$ of the ferrule 73.

SECOND EMBODIMENT

Figure 9A:
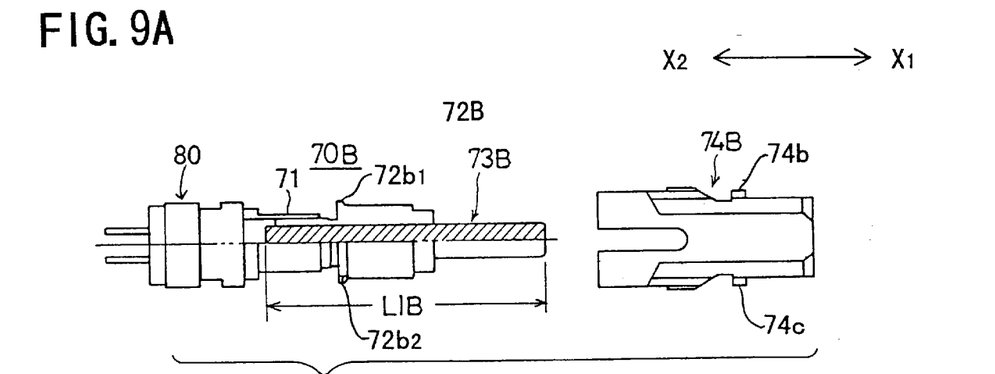
FIGS. 9A–9C are digrams showing the construction of an optical receptacle module according to a second embodiment of the present invention.
Figure 9B:
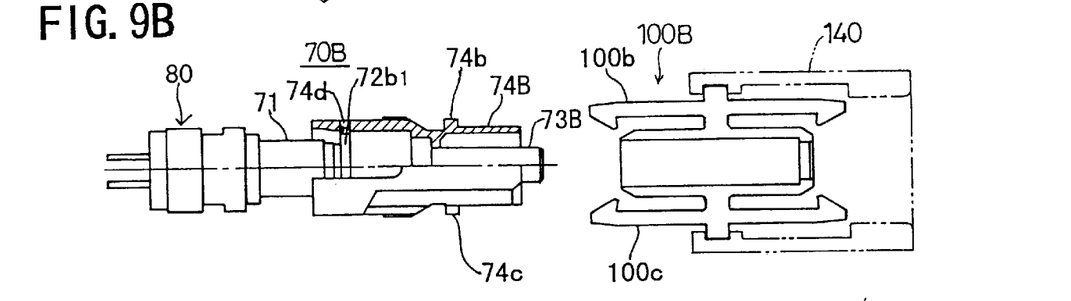
Figure 9C:
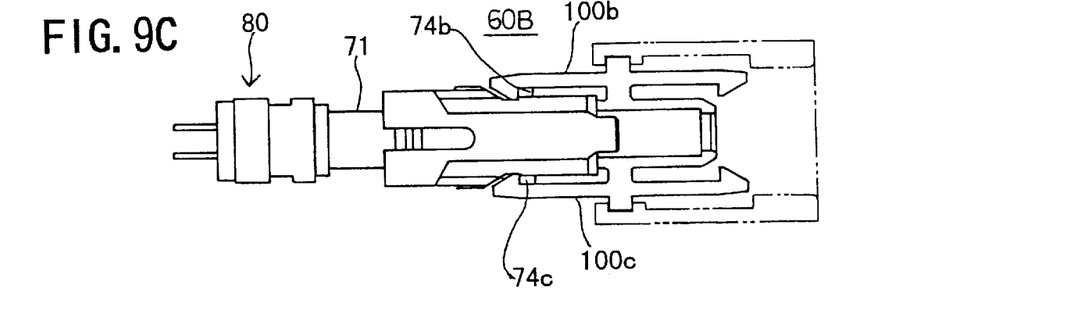

FIGS. 9A–9C show the construction of an optical receptacle module 60B according to a second embodiment of the present invention, wherein the optical receptacle module 60B includes an optical receptacle 70B corresponding to the optical receptacle 70 of the first embodiment and a frame member 74B corresponding to the frame member 74.

As indicated in FIG. 9A, the optical receptacle 70B includes, in addition to the optical module unit 80 of the first embodiment, a ferrule holder 72B that replaces the ferrule holder 72, wherein the ferrule holder 72B has a construction similar to that of the ferrule holder 72 and holds therein a ferrule 73B corresponding to the ferrule 73, except that the flange parts $72b_1$ and $72b_2$ are provided at an end of the ferrule holder 72B facing the $X_2$-direction. Further, the frame member 74B has a construction similar to that of the frame member 74 except that the lateral projections 74b and 74c are formed not at the end facing the $X_1$-direction but at an intermediate position.

As indicated in FIG. 9B, the frame member 74B is mounted on the optical receptacle 70B in the state that the flange part $72b_1$ of the ferrule holder 72B engages the corresponding opening 74d of the frame member 74B, and an adapter unit 100B corresponding to the adapter unit 100 is mounted on the frame member 74B such that the catch arm 100b of the adapter unit 100 engages the lateral projection 74b and the catch arm 100c engages the lateral projection 74c as indicated in FIG. 9C. It should be noted that the adapter unit 100B is also designed for engagement with the optical plug 140 of the SC-type.

Thereby, the present embodiment maintains the advantageous feature of the optical module unit 80 forming an integral body with the frame member 74B similarly to the previous embodiment, and the use of the optical receptacle module 60B in the optical home terminal 40A provides the feature of reduced size due to the elimination of optical fiber coil in the optical home terminal.

On the other hand, it should be noted that the ferrule 73B of the present embodiment has an increased length $L_{1B}$ as compared with the length $L_1$ of the ferrule 73B of the previous embodiment in view of the fact that the flange part 72b is located at the position offset in the $X_2$-direction as compared with the lateral projection 74b of the frame member 74B as can be seen in FIG. 9B. With this regard, the construction of the first embodiment described previously is advantageous.

THIRD EMBODIMENT

Figure 10A:
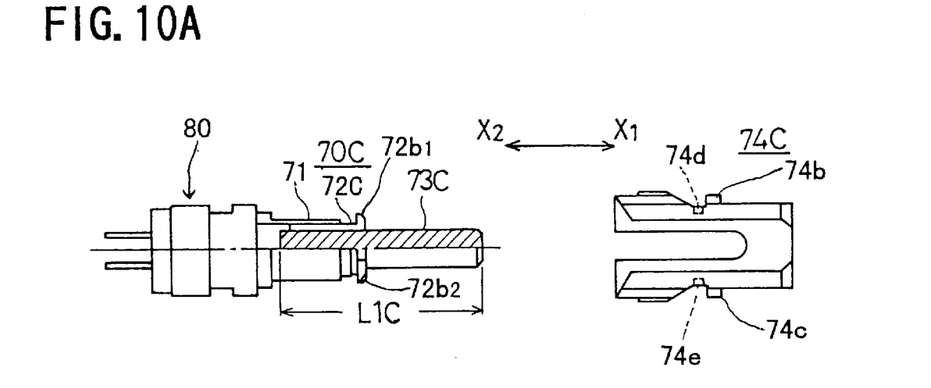
FIGS. 10A–10C are diagrams showing the construction of an optical receptacle module according to a third embodiment of the present invention.
Figure 10B:
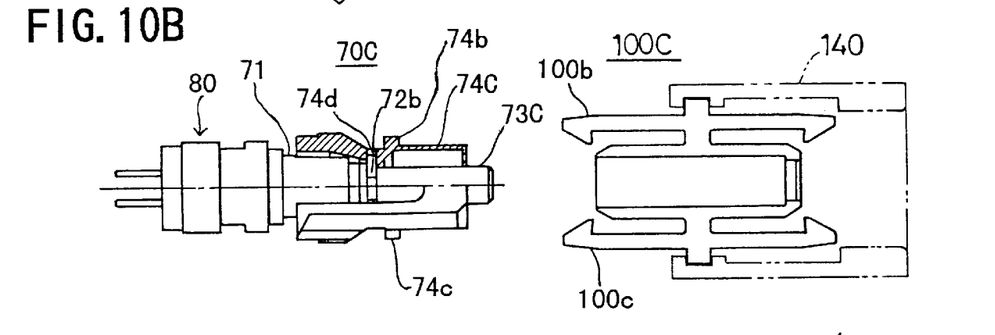
Figure 10C:
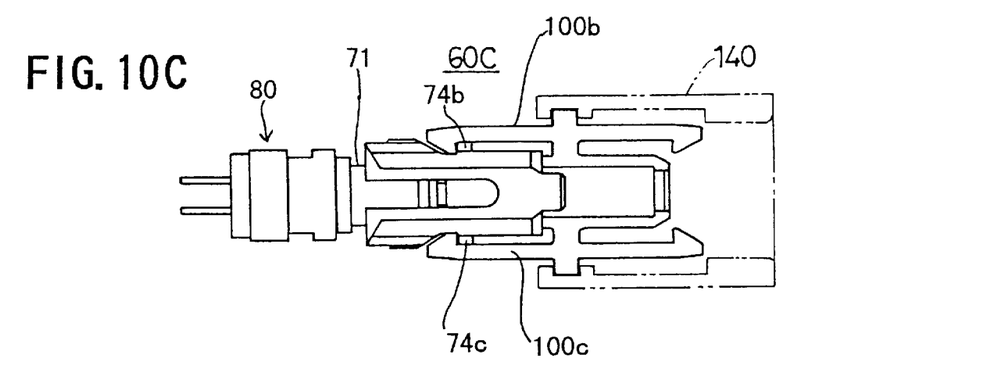

FIGS. 10A–10C show the construction of an optical receptacle module 60C according to a third embodiment of the present invention, wherein the optical receptacle module 60C includes an optical receptacle 70C corresponding to the optical receptacle 70 of the first embodiment and a frame member 74C corresponding to the frame member 74.

As indicated in FIG. 10A, the optical receptacle 70C includes, in addition to the optical module unit 80 of the first embodiment, a ferrule holder 72C that replaces the ferrule holder 72, wherein the ferrule holder 72C has a construction similar to that of the ferrule holder 72 and holds therein a ferrule 73C corresponding to the ferrule 73, except that the flange parts $72b_1$ and $72b_2$ are provided at an end of the ferrule holder 72C facing the $X_1$-direction. Further, the frame member 74C has a construction similar to that of the frame member 74 except that the lateral projections 74b and 74c are formed not at the end facing the $X_1$-direction but at an intermediate position similarly to the embodiment of FIG. 9A. Further, it should be noted that the elongate cutouts 74d and 74d are formed adjacent to the lateral projections 74b and 74c at the side of the $X_2$-direction.

As indicated in FIG. 10B, the frame member 74C is mounted on the optical receptacle 70C in the state that the flange part $72b_1$ of the ferrule holder 72C engages the corresponding opening 74d of the frame member 74C, and an adapter unit 100C corresponding to the adapter unit 100 is mounted on the frame member 74C such that the catch arm 100b of the adapter unit 100C engages the lateral projection 74b and the catch arm 100c engages the lateral projection 74c as indicated in FIG. 9C. It should be noted that the adapter unit 100C is also designed for engagement with the optical plug 140 of the SC-type.

Thereby, the present embodiment maintains the advantageous feature of the optical module unit 80 forming an integral body with the frame member 74C similarly to the previous embodiment, and the use of the optical receptacle module 60C in the optical home terminal 40A provides the feature of reduced size due to the elimination of optical fiber coil in the optical home terminal.

Further, because of the fact that the flange parts $72b_1$ and $72b_2$ are formed at the end of the ferrule holder 72 facing the $X_1$-direction, and further in view of the fact that the cutouts 74d and 74e are formed adjacent to the lateral projections 74b and 74c at the side of the $X_2$-direction, the length $L_{1C}$ of the ferrule 73C becomes an intermediate value between the length $L_1$ of the first embodiment and the length $L_{1B}$ of the second embodiment.

Further, the present invention is by no means limited to the embodiments described heretofore, but various variations and modifications may be made without departing from the scope of the invention.

What is claimed is:

1. An optical receptacle module, comprising:
    an optical module unit including an optical device in a body of said optical module unit, said optical module unit further having a sleeve part as an integral body with said body of said optical module unit;
    a ferrule holder provided on said optical module unit so as to engage said sleeve part, said ferrule holder holding therein a ferrule in a state such that said ferrule has an end projecting from said ferrule holder at an end of said ferrule holder away from said optical device;
    a frame member mounted on said ferrule holder, said frame member including a first engaging part for engaging a corresponding second engaging part formed on said ferrule holder; and
    an adapter unit mounted on said frame member so as to hold said exposed end of said ferrule, said adapter unit having a first sleeve part holding therein said exposed end of said ferrule and a second, opposite sleeve part adapted for accepting a ferrule of an external optical plug, said adapter unit further having a third engaging part for engaging a corresponding fourth engaging part provided on said frame member;
    wherein said first and second engaging parts engage with each other at a location offset in a direction away from said optical device with respect to a location in which said third and fourth engaging parts engage with each other.

2. An optical receptacle module as claimed in claim 1, wherein said first sleeve part of said adapter unit contacts an end surface of said frame member facing away from said optical device.

3. An optical receptacle module as claimed in claim 2, wherein said first sleeve part of said adapter unit has a reduced length with respect to said second sleeve part of said adapter unit.

4. An optical receptacle module as claimed in claim 1, wherein said ferrule has another end facing said optical device such that said another end of said ferrule is receded from a corresponding end of said ferrule holder facing said optical device, in a direction away from said optical device.

5. An optical receptacle module as claimed in claim 1, wherein said end of said ferrule facing said optical device is slanted with respect to a plane perpendicular to an optical axis of said ferrule.

6. An optical receptacle, comprising:
    an optical module unit including an optical device in a body of said optical module unit, said optical module unit further having a sleeve part as an integral body with said body of said optical module unit;
    a ferrule holder provided on said optical module unit so as to engage said sleeve part, said ferrule holder holding therein a ferrule in a state such that said ferrule has an end projecting from said ferrule holder at an end of said ferrule holder away from said optical device;
    a frame member mounted on said ferrule holder, said frame member including a first engaging part for engaging a corresponding second engaging part provided on said ferrule holder, said frame member being thereby mounted on said ferrule holder in a state that said first engaging part engages said second engaging part; and
    said first and second engaging parts engaging with each other at a location offset in a direction away from said optical device with respect a projection formed on said frame member for engagement with an adapter unit used to accept a standard optical plug.

7. An optical module, comprising:

an optical receptacle, comprising: an optical module unit including an optical device in a body of said optical module unit, said optical module unit further having a sleeve part as an integral body with said body of said optical module unit; a ferrule holder provided on said optical module unit so as to engage said sleeve part, said ferrule holder holding therein a ferrule in a state such that said ferrule has an end projecting from said ferrule holder at an end of said ferrule holder away from said optical device; a frame member mounted on said ferrule holder, said frame member including a first engaging part for engaging a corresponding second engaging part formed on said ferrule holder;

an adapter unit mounted on said frame member of said optical receptacle so as to hold said exposed end of said ferrule, said adapter unit having a first sleeve part holding therein said exposed end of said ferrule and a second, opposite sleeve part adapted for accepting a ferrule of an external optical plug, said adapter unit further having a third engaging part for engaging a corresponding fourth engaging part provided on said frame member;

said first and second engaging parts engaging with each other at a location offset in a direction away from said optical device with respect to a location in which said third and fourth engaging parts engage with each other; and a metal case holding therein said optical receptacle module in such a state that said optical receptacle is spatially separated from said metal case.

8. An optical module as claimed in claim 7, wherein said adapter unit is mounted on said metal case.

* * * * *